March 12, 1957     W. V. E. THOMPSON     2,785,005
HALF-CIRCLE SPRINKLER HEAD
Filed March 2, 1956
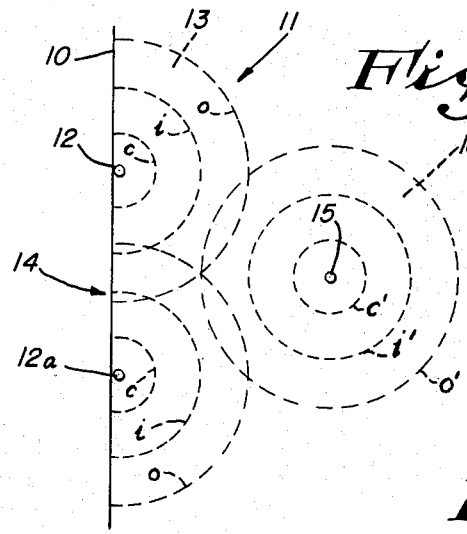
*Fig. 1.*
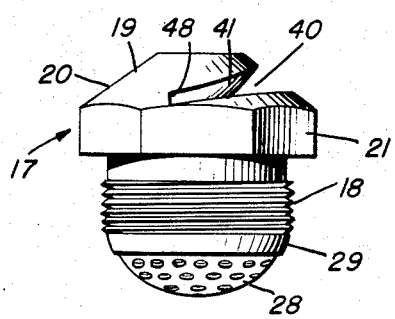
*Fig. 2.*
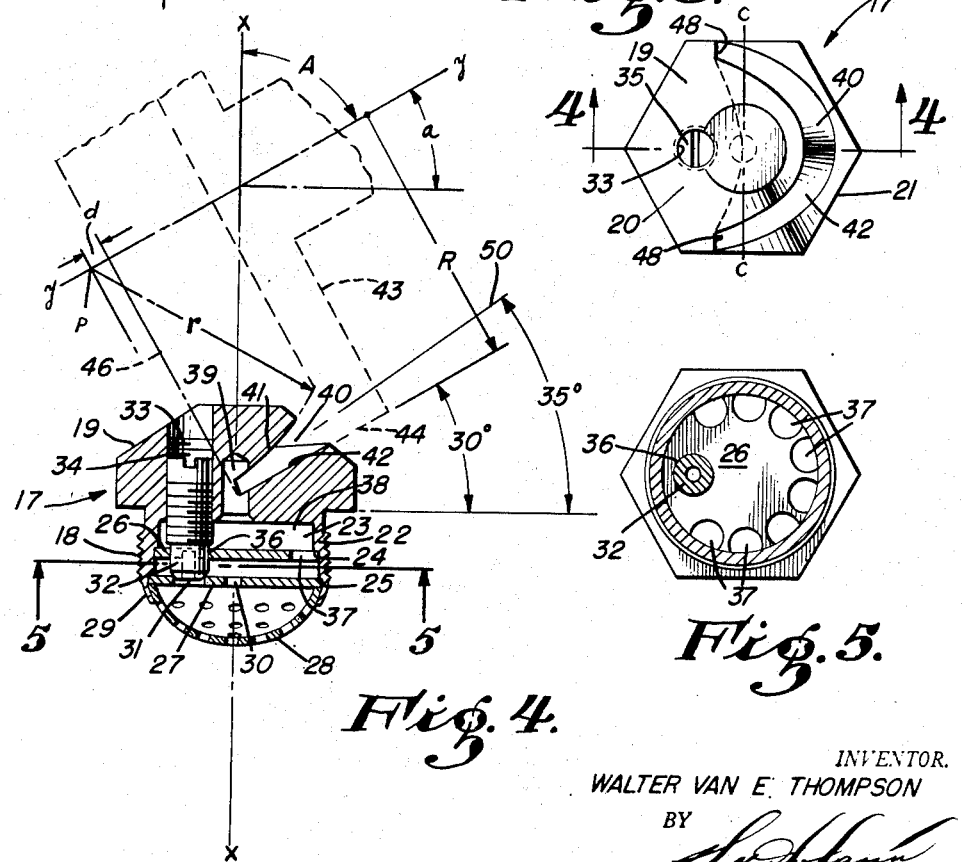
*Fig. 3.*    *Fig. 4.*    *Fig. 5.*
INVENTOR.
WALTER VAN E. THOMPSON
BY
*Attorney*

United States Patent Office 2,785,005
Patented Mar. 12, 1957

2,785,005
HALF-CIRCLE SPRINKLER HEAD

Walter Van E. Thompson, Los Angeles, Calif.

Application March 2, 1956, Serial No. 569,076

6 Claims. (Cl. 299—18)

This invention relates in general to lawn sprinklers and relates in particular to half-circle sprinkler heads which are employed along the edges of lawns.

A simple, half-circle sprinkler head has been long sought which will provide a reasonably even distribution of water along the lawn edge. It is an object of the present invention to provide a half-circle sprinkler head which will not leave dry spots in the lawn along the lawn edge. The sprinkler head of the present invention fulfills its objective by providing a spray of required water distribution characteristics, so that adjacent to the half-circle spray head there is sufficient application of water, as compared to the distribution of water over other areas of the lawn, to maintain the grass in the areas adjacent the half-circle sprinkler heads in good condition.

It is an object of the invention to provide a half-circle sprinkler head having parts arranged to receive a stream of water from water delivery piping and to break-up the stream of water in such a manner that a spray is produced which delivers a greater proportion of the water, per unit area of lawn surface, close to the sprinkler head than at the periphery of the spray. For example, in the preferred embodiment of the invention herein disclosed, the area of distribution of the spray may be divided into three half rings of substantially the same width, namely, central, intermediate, and outer half rings which receive water from the spray in the relation of three, three and one units per unit area. That is to say, in the central and intermediate areas of distribution surrounding the half-circle spray head, three units or volumes of water are received on each square foot of area, but in the outer area of distribution only one unit or volume of water is received per square foot of lawn area. It is possible, therefore, to space the half-circle sprinkler heads so that the outer areas of distribution of the sprays issuing therefrom will overlap, this area of overlap, accordingly, receiving one unit of water from each of the adjacent half-circle sprinkler heads, or a total of two units of water. In conjunction with these half-circle sprinkler heads, a sprinkler head which issues a circular spray is located in the lawn so that the peripheral portion of its water spray will fall upon the area of overlap between the adjacent half-circle sprinkler heads, increasing the quantity of water received by the area of overlap to three units.

It is an object of the invention to provide a half-circle sprinkler head having a diagonally directed spray outlet port in the form of a modified half-circle, and being defined by a spherical or spheroidal upper wall and a lower cylindrical wall.

A further object of the invention is to provide a spray head having simple means of adjustment for controlling the flow of water through the nozzle openings.

Further objects and advantages of the invention may be brought out in the following part of the specification therein small details have been described for the purpose of providing a competent disclosure, without intending, however, to limit the scope of the invention which is defined by the appended claims.

Referring to the accompanying drawings which are for illustrative purposes only:

Fig. 1 is a schematic plan view showing the preferred manner of using the half-circle spray head;

Fig. 2 is an elevational view to enlarged scale of the spray head;

Fig. 3 is a plan view corresponding to Fig. 2;

Fig. 4 is a sectional view taken as indicated by the line 4—4 of Fig. 3; and

Fig. 5 is a sectional view taken as indicated by the line 5—5 of Fig. 4.

In Fig. 1, the line 10 represents the edge of the lawn 11. A half circle sprinkler head 12 is shown at the edge 10 so that it will throw a half-circle spray 13 of water onto the lawn 11. For the purpose of indicating the distribution of the water of the spray 13, the periphery of the spray is indicated by an outer half-circle $o$, within which there are equally spaced intermediate and inner half-circles $i$ and $c$. The spray head of the present invention is characterized by an ability to deliver approximately three units of water in each of the central and intermediate half-circles $c$ and $i$, and one unit of water along the outer half-circle $o$. An adjacent half-circle spray head, indicated by the numeral 12a and being identical to the spray head 12, is placed along the lawn edge 10 at such distance from the spray head 12 so that the outer half-circles $o$ of the spray heads 12 and 12a will overlap as shown at 14.

If a full-circle spray head 15, capable of delivering a circular spray 16 with inner, intermediate and outer circles $c'$, $i'$, and $o'$, which respectively receive approximately three, three and one units of water per unit of area thereof, is placed in the lawn at equal distances from the spray heads 12 and 12a and so that the circle of distribution $o'$ overlaps the half-circles $o$ or the sprays issuing from the spray heads 12 and 12a, as shown in Fig. 1, there will be an acceptable distribution of water along the edge 10 of the lawn. There will be no dry spots adjacent the half-circle sprinkler heads 12 and 12a, and at the half-circles 12 between the spray heads 12 and 12a there will be a delivery of approximately three units of water, this being accomplished at a water pressure of about eight pounds per square inch at the spray nozzle inlets.

The spray head 12, as shown in Figs. 2–4 comprises a body 17 having an externally threaded barrel portion 18 and a head portion 19 including a truncated conical portion 20 and a polygonal lower portion 21. The barrel 18, as shown in Figs. 4 and 5, has a downwardly projecting wall 22 defining a circular cavity 23. The wall 22 has internal spaced shoulders 24 and 25 and a baffle plate 26 and a valve plate 27 are arranged respectively against the shoulders 24 and 25 as shown in Fig. 4. A convex strainer plate 28 is placed so that its periphery rests against the periphery of the valve plate 27 and the lip 29 of the wall 22 is deflected inwardly around the peripheral portion of the strainer plate so as to hold it securely in place.

The valve plate 27 has therein a central opening 30 through which a small stream of water may continuously flow. Near one edge thereof valve plate 27 has therein a valve port 31, the flow through which is varied by an adjustable closure pin 32 which is threaded upwardly into an opening 33 passing vertically through one side of the head 19. The opening 33 has threads 34 extending upwardly from its lower end to a point near its upper end. Therefore, the pin 32 cannot be screwed upwardly out of the opening 33. However, a screw driver may be passed into the upper end of the opening 33 to engage the slot 35 in the upper end of the pin 32, whereby it may be rotated and thereby adjusted with relation to the valve port. This arrangement makes possible the use of a relatively small valve port, since the flow through the valve port is employed to supplement the flow of water in through the opening 30 and thereby deliver the required amount of water to the half-circle spray 13. The baffle plate 26 has therein an opening 36 through which the lower portion of the pin 32 passes, and around its edge has a plurality of half-circle notches 37 through which water may flow into the inlet chamber 38 which is formed above the baffle plate 26.

On the central axis $x$—$x$, the head 19 has a spray inlet passage 39 extending upwardly from the chamber 38 and a spray orifice 40 extending upwardly and outwardly from the spray inlet passage 39 to the conical face of the head 19. The spray orifice 40 is defined by an upper spheroidal wall 41 and a lower cylindrical wall 42 which are generated around an axis $y$—$y$ which intersects the axis $x$—$x$ at an angle A thereto of approximately 60° or at an angle $a$ of about 30° to horizontal. The surface 41 is a portion of a sphere generated around the point $p$, with a radius $r$ of approximately one inch. The cylindrical wall 42 has a radius R of about one-sixteenth of an inch greater than the radius $r$.

The orifice 40 is cut by use of a hollow milling cutter 43 rotated around the axis $y$—$y$ and fed downwardly along the axis $y$—$y$. The cutter 43 has an outer cylindrical face 44 corresponding to the wall 42 of the spray orifice 40 and an inner spheroidal face generated at a radius $r$ around the point $p$ which is disposed at a small distance $d$ externally from the end 46 of the milling cutter 43. The milling cutter 43 is fed into the head 19 until the end 46 of the mill, as indicated at 46 in Fig. 4 intersects the vertical axis $x$—$x$. Therefore, as indicated at 48 in Figs. 2 and 3, the lateral extremities of the spray orifice 40 lie leftwardly of the central plane $c$—$c$ of the head 19. As indicated by the line 50 of Fig. 4, the center line of the spray which issues from the orifice 40 is at an angle of approximately 35° from horizontal. This arrangement of cooperating walls 41 and 42 in the discharge orifice 40 of the spray head results in the breaking up of the stream of water received through the passage 39 in such manner that the distribution referred to in the foregoing is obtained. The spray 13 issues with an explosive, hissing action, in the form of droplets of medium size and with minimum formation of vapor or mist to be carried off by mild breezes.

I claim:

1. In a part-circle sprinkler head: a body having an inlet passage leading upwardly therein; and a spray orifice extending upwardly and outwardly therefrom, said orifice being defined by an upper convex wall which is spheroidal and a lower wall which is cylindrical, both of said walls being generated around an axis which slopes upwardly and forwardly from a point of intersection with the axis of said inlet passage, the mouth of said orifice being semicircular and the inner extremity of said orifice intersecting said inlet passage.

2. In a part-circle sprinkler head: a body having a cavity in the lower portion thereof and an inlet passage leading upwardly from said cavity on a vertical axis; a spray orifice extending upwardly and outwardly therefrom, said orifice being defined by an upper convex wall which is spheroidal and a lower wall which is cylindrical, both of said walls being generated around an axis which slopes upwardly and forwardly from a point of intersection with the axis of said inlet passage, the mouth of said orifice being semicircular and the inner extremity of said orifice intersecting said inlet passage; a strainer plate at the lower end of said cavity; a valve plate adjacent said strainer plate having therein a valve port and an additional water inlet opening; a baffle plate in said cavity above said valve plate having a pin opening aligned with said port of said valve plate and also peripheral openings for the flow of water to said passage; and a valve pin threaded into said body so that its upper end is exposed and its lower end passes through said pin opening in said baffle plate into a position of cooperation with said port of said valve plate, the upper end of said pin being prepared for engagement by a tool whereby it may be turned.

3. In a part-circle sprinkler head: a body having a cavity in the lower portion thereof and an inlet passage leading upwardly from said cavity on a vertical axis; a spray orifice extending upwardly and outwardly therefrom, said orifice being defined by an upper convex wall which is spheroidal and a lower wall which is cylindrical, both of said walls being generated around an axis which slopes upwardly and forwardly from a point of intersection with the axis of said inlet passage, the mouth of said orifice being semicircular and the inner extremity of said orifice intersecting said inlet passage; a strainer plate at the lower end of said cavity; a valve plate above said strainer plate having therein openings for controlling the flow of water into the sprinkler head; and a baffle plate in said cavity above said valve plate having water flow openings around the periphery thereof.

4. In a part-circle sprinkler head: a body having an inlet passage leading upwardly therein; and a spray orifice extending upwardly and outwardly therefrom, said orifice being defined by an upper convex wall which is a portion of a sphere having a radius of approximately one inch and a lower wall which is a portion of a cylinder having a radius which is slightly greater than the radius of said sphere, both of said walls being generated around an axis which slopes upwardly and forwardly from a point of intersection with the axis of said inlet passage at an angle of approximately 60° thereto, the mouth of said orifice being semicircular and the inner extremity of said orifice intersecting said inlet passage.

5. In a part-circle sprinkler head: a body having a cavity in the lower portion thereof and an inlet passage leading upwardly from said cavity on a vertical axis; a spray orifice extending upwardly and outwardly therefrom, said orifice being defined by an upper convex wall which is a portion of a sphere having a radius of approximately one inch and a lower wall which is a portion of a cylinder having a radius which is slightly greater than the radius of said sphere, both of said walls being generated around an axis which slopes upwardly and forwardly from a point of intersection with the axis of said inlet passage at an angle of approximately 60° thereto, the mouth of said orifice being semicircular and the inner extremity of said orifice intersecting said inlet passage; a strainer plate at the lower end of said cavity; a valve plate adjacent said strainer plate having therein a valve port and an additional water inlet opening; a baffle plate in said cavity above said valve plate having a pin opening aligned with said port of said valve plate and also peripheral openings for the flow of water to said passage; and a valve pin threaded into said body so that its upper end is exposed and its lower end passes through said pin opening in said baffle plate into a position of cooperation with said port of said valve plate, the upper end of said pin being prepared for engagement by a tool whereby it may be turned.

6. In a part-circle sprinkler head: a body having an inlet passage leading upwardly therein; and a spray orifice extending upwardly and outwardly therefrom, said orifice being defined by an upper convex wall which is a portion of a sphere having a radius of approximately one inch and a lower wall which is a portion of a cylinder having a radius which is slightly greater than the radius of said sphere, both of said walls being generated around an axis which slopes upwardly and forwardly from a point of intersection with the axis of said inlet passage at an angle of approximately 60° thereto, said sphere being generated around a point which is offset from the plane defined by the inner extremity of said orifice, the mouth of said orifice being semicircular and the inner extremity of said orifice intersecting said inlet passage.

References Cited in the file of this patent

UNITED STATES PATENTS

| | | | |
|---|---|---|---|
| 510,496 | Anderson | Dec. 12, | 1893 |
| 1,193,010 | Gibbs | Aug. 1, | 1916 |
| 1,559,655 | Thompson | Nov. 3, | 1925 |
| 1,954,863 | Coles et al. | Apr. 17, | 1934 |